US010766058B2

(12) United States Patent
Boukari

(10) Patent No.: US 10,766,058 B2
(45) Date of Patent: *Sep. 8, 2020

(54) DEVICE FOR CLEANING, ESPECIALLY THE PIPES OF THE DRINKING WATER CIRCUIT OF AN AIRCRAFT

(71) Applicant: PRODOSE SARL, Bessieres (FR)

(72) Inventor: Morou Boukari, Toulouse (FR)

(73) Assignee: PRODOSE SARL, Bessieres (FR)

( * ) Notice: Subject to any disclaimer, the term of this patent is extended or adjusted under 35 U.S.C. 154(b) by 173 days.

This patent is subject to a terminal disclaimer.

(21) Appl. No.: 15/791,022

(22) Filed: Oct. 23, 2017

(65) Prior Publication Data

US 2018/0085796 A1    Mar. 29, 2018

Related U.S. Application Data

(63) Continuation-in-part of application No. 14/908,361, filed as application No. PCT/FR2014/051752 on Jul. 8, 2014, now Pat. No. 9,821,350.

(30) Foreign Application Priority Data

Jul. 19, 2013   (FR) ..................... 13 57155

(51) Int. Cl.
*B08B 9/032* (2006.01)
*B64F 5/30* (2017.01)
(Continued)

(52) U.S. Cl.
CPC ............ *B08B 9/0325* (2013.01); *B08B 13/00* (2013.01); *B64F 5/30* (2017.01); *E03B 7/006* (2013.01);
(Continued)

(58) Field of Classification Search
CPC .......... B08B 3/02; B08B 3/024; B08B 3/026; B08B 3/028; B08B 3/10; B08B 9/032; B08B 9/0321; B08B 9/0325; B08B 13/00; B08B 2203/007; F28G 9/00; F28G 9/005; B64F 5/30; E03B 7/006; B64D 11/04;
(Continued)

(56) References Cited

U.S. PATENT DOCUMENTS 1,885,644 A    11/1932  Thomas
1,901,238 A     3/1933  Harcourt
(Continued)

FOREIGN PATENT DOCUMENTS

DE    202005012380 U1   11/2005
JP        H07041352 A    2/1995
(Continued)

OTHER PUBLICATIONS

International Search Report, PCT/FR2014/051752, European Patent Office, dated Jun. 10, 2014 (one page).
(Continued)

*Primary Examiner* — David G Cormier
(74) *Attorney, Agent, or Firm* — Paul & Paul

(57) ABSTRACT

The invention relates to a cleaning device, in which said device is supplied with liquid. The device is characterised in that it comprises a mobile chassis supporting a plurality of functional subassemblies necessary for the production of a hot liquid in a condensing gas boiler with sealed combustion chamber. The invention can be used to clean the pipes in an aircraft.

20 Claims, 9 Drawing Sheets

(51) Int. Cl.
  *F24H 8/00* (2006.01)
  *B08B 13/00* (2006.01)
  *E03B 7/00* (2006.01)
(52) U.S. Cl.
  CPC .......... *F24H 8/00* (2013.01); *B08B 2203/007* (2013.01); *Y02B 30/102* (2013.01)
(58) Field of Classification Search
  CPC . F24H 1/009; F24H 8/00; F24H 8/003; F24H 8/006; Y02B 30/102
  See application file for complete search history.

(56) References Cited

U.S. PATENT DOCUMENTS

| | | |
|---|---|---|
| 3,522,909 A | 8/1970 | Arant |
| 4,071,919 A | 2/1978 | Fields et al. |
| 4,112,538 A | 9/1978 | Bates |
| 5,500,976 A | 3/1996 | Rohrbacher et al. |
| 2008/0128032 A1 | 6/2008 | Lapetina et al. |

FOREIGN PATENT DOCUMENTS

| | | |
|---|---|---|
| JP | 2005265351 A | 9/2005 |
| JP | 2008253964 A | 10/2008 |
| JP | 2009297588 A | 12/2009 |
| JP | 2010101524 A | 5/2010 |
| JP | 2010149653 A | 7/2010 |
| JP | 2010264336 A | 11/2010 |
| JP | 2011169571 A | 9/2011 |
| JP | 2012157821 A | 8/2012 |
| WO | 02092445 A1 | 11/2002 |
| WO | 2010142924 A2 | 12/2010 |

OTHER PUBLICATIONS

International Preliminary Report on Patentability, PCT/FR2014/051752, World Intellectual Property Organization, English Translation, dated Dec. 2, 2015 (six pages).
Heat & Cool, Furnaces and Boilers (11 pages).
U.S. Boiler Company, What is a Condensing Gas Boiler? (two pages).
Condensing Boiler, Wikipedia (six pages).

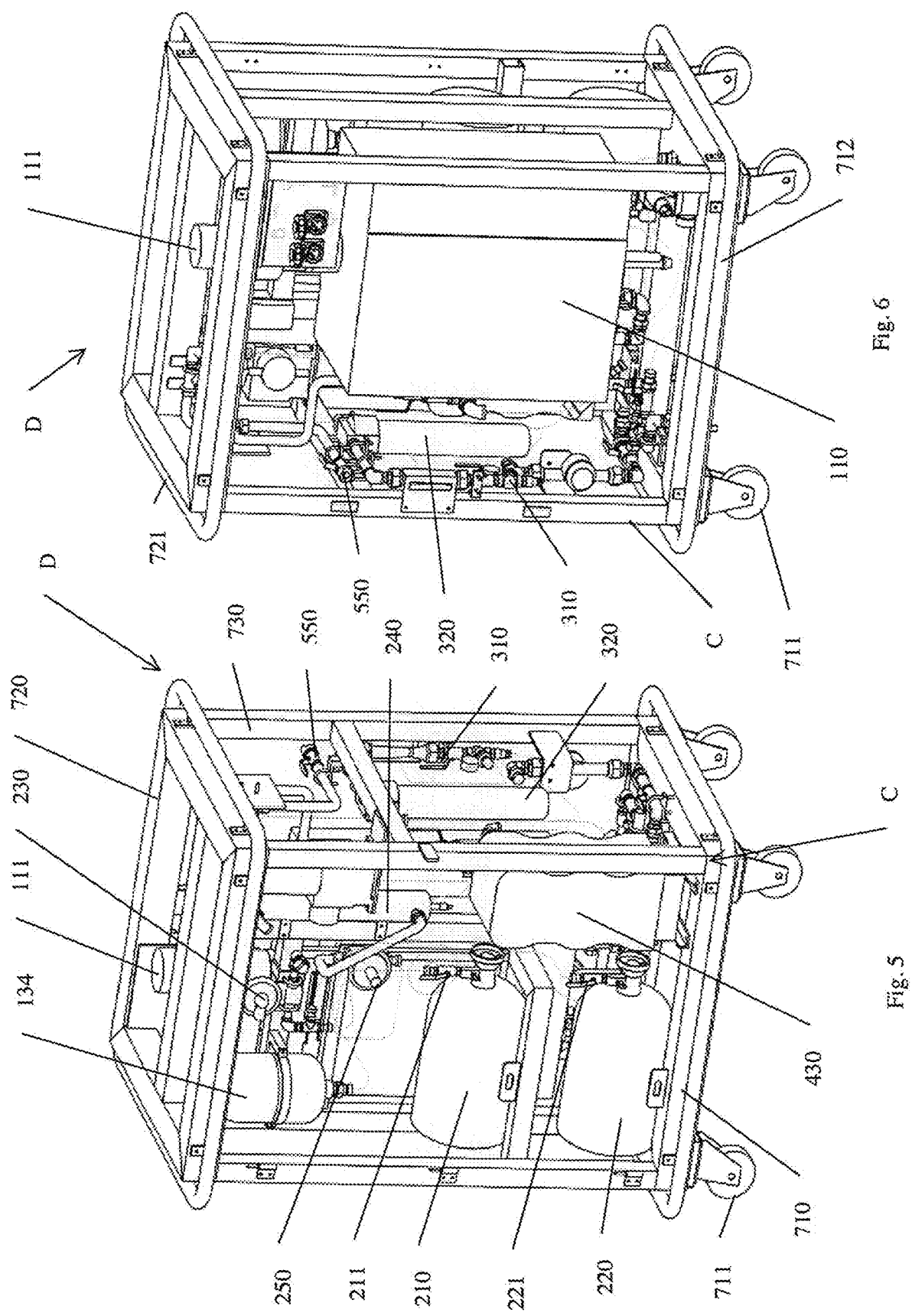

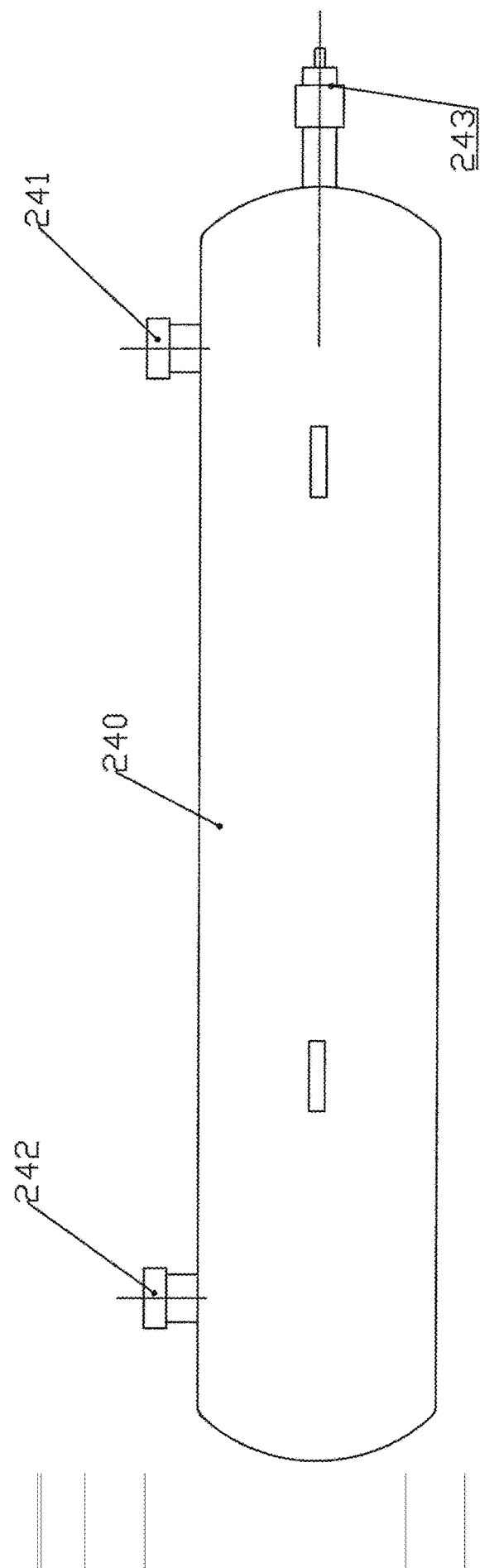

DEVICE FOR CLEANING, ESPECIALLY THE PIPES OF THE DRINKING WATER CIRCUIT OF AN AIRCRAFT

CROSS-REFERENCE TO RELATED APPLICATIONS

This application is a continuation-in-part of pending U.S. patent application Ser. No. 14/908,361, filed Jan. 28, 2016, which is a 371 national stage application of International Application PCT/FR2014/051752, filed Jul. 8, 2014, and claims the priority of French Application No. 1357155, filed on Jul. 19, 2013.

FIELD OF APPLICATION OF THE INVENTION

The present invention relates to the field of cleaning and in particular to the adaptations for cleaning by using a hot liquid in the best conditions.

DESCRIPTION OF THE PRIOR ART

There exist in the prior art methods for treating the drinking-water circuit of an aircraft that propose circulating, in said network, a liquid and in particular water, at high temperature.

Thus, for example, the document WO 2010/14924 proposes a method for treating the drinking-water circuit of an aircraft, said circuit being of the type comprising at least one storage tank, a plurality of pipes offering a plurality of inlet and outlet points for water, and filtration means comprising removable filtration cartridges equipping certain pipes, remarkable in that it consists of
  not removing the filtration cartridges,
  filling said tank by means of a treatment liquid,
  circulating said treatment liquid, which is water brought to high temperature, in the circuit with the cartridges installed.

Another document WO 2012/168645 proposes a method for the dynamic cleaning of the conduits supplying drinking-water for a vehicle, consisting of creating a shock wave in the conduit to be cleaned,
  remarkable in that it consists of:
  partially filling a space with a liquid,
  filling the space not occupied by the liquid, with pressurised gas,
  releasing the liquid through a contraction communicating with the end of said conduit or conduits to be cleaned, the other end of which is open, while maintaining the pressure, so as:
  to create an accelerated movement of the liquid firstly and of the mixture of gas and liquid created secondly, and then
  to generate a shock wave, once the space is emptied, a shock wave that propagates through the mixture.

According to one embodiment, said liquid is water raised to high temperature.

The condensing gas boiler technology as described in a fixed application for heating water of a swimming pool in the document DE 20 2005 012380 is also known in the prior art, outside the aeronautical field.

DESCRIPTION OF THE INVENTION

The applicant has carried out research on a device for producing hot liquid making it possible to implement not only the methods described above but also any cleaning method able to use a hot liquid. To do this, the applicant has identified several criteria, including the following:
  the liquid must be able to be raised to high temperature very quickly,
  the volume of liquid raised to high temperature must be large,
  the flow rate of liquid must also be great,
  the device must have a volume enabling it to be transported in an aircraft,
  the device must be able to be used in the workshop where the surface to be cleaned, the object to be cleaned or the aircraft to be treated is situated and close to the latter,
  the device must be able to move in the workshop, the place where the surface to be cleaned, the object to be cleaned or the aircraft to be treated is situated.

This research resulted in the design and production of a cleaning device, said device being supplied with liquid, remarkable in that it comprises a mobile chassis supporting a plurality of functional subassemblies necessary for the production of a hot liquid, including a condensing gas boiler with a sealed combustion chamber.

The use of this type of boiler is particularly original in the case of a mobile device since it is an item of equipment that is conventionally fixed.

Despite this, the applicant proposes using such a technology in that it proposes the power necessary for the rapid heating of a large volume of liquid able to flow at high rate.

Another particularly advantageous feature of this boiler lies in the fact that the exhaust gases that it produces have a low temperature, which allows for example use thereof in a closed hangar close to an aircraft. This is because the other technologies are likely to produce fume gases at very high temperatures, preventing them from being used in closed premises or close to hazardous areas such as an aeronautical workshop or close by. It becomes possible to propose such industrial means for heating a liquid for any type of cleaning application.

Such a boiler technology is particularly advantageous in that it allows adjustment of the flow rate as well as adjustment of the boiler output. It is then possible to heat the water for purposes of treating a drinking-water circuit on several types of aircraft. Thus, according to another feature, the device provides a cleaning of the pipework of the drinking-water system of an aircraft, said device being independent of said aircraft and being connected to said system occasionally.

According to a particularly advantageous feature, said liquid is water.

Given the need for a mobile configuration and the use of an operation in an aeronautical workshop, the gas supply must be portable by bottles. The standards require that each bottle does not exceed a certain volume, the device is remarkable in that it accommodates several gas bottles proposing a sufficient volume of gas able to supply the energy necessary for the production of a large quantity of heat over a very short period. It will be understood that this limitation of the gas volume to a portable volume makes it possible to envisage the use of the invention for cleaning elements other than the drinking-water distribution pipes of an aircraft.

The presence of a plurality of gas bottles requiring a plurality of pressure-reducing valves and the requirement by the boiler for a constant supply of a large quantity of gas may have negative consequences for the device, for example:
  an offset in the pressure reduction,
  frosting of the pipes,
  the presence of condensation water in the pipes, a volume of gas not always available when the boiler needs it.

In order to remedy this drawback, the applicant has advantageously designed an intermediate gas reservoir positioned between the boiler and the pressure-reducing valve or valves associated with one or more gas bottles for receiving the gas coming to be expanded and to supply the boiler. When there are several bottles, this reservoir thus receives the expanded gas issuing from each bottle and provides mixing thereof for greater homogeneity. It also creates a volume of gas that is always available whatever the output of the boiler. Finally, it provides decantation of the condensation created by the pressure reduction.

These features make it possible to use a condensing gas boiler with sealed combustion chamber in the best conditions and even makes it possible to oversize it in order to be able to use the device whatever the cleaning application.

According to a first solution for implementation, the boiler heats a liquid in a primary circuit exchanging its heat with a liquid situated in a vessel.

In a second solution, the boiler heats a liquid in a primary circuit that exchanges with a secondary circuit inside an exchanger.

In a third solution, the liquid in the secondary circuit is preheated by means of a liquid in the primary circuit emerging from the exchanger before the liquid in the secondary circuit passes into the exchanger.

The discharge and supply of air in this boiler have also been particularly studied in order in particular to meet the constraints of compactness such as those related to operation in an aeronautical workshop. Thus, according to another feature, said boiler is equipped with a dual-flow discharge flue allowing both discharge of the exhaust and entry of fresh air.

According to another particularly advantageous feature of the invention, the device also comprises a module for metering a treatment product that is injected into the heated liquid discharged from the device before it is introduced into the drinking-water system of the aircraft or before it emerges for example from a spray nozzle.

According to another particularly advantageous feature of the invention, the device comprises a module for connection to the drinking-water system of the aircraft equipped with a valve, the selection of the position of which makes it possible:
  to drain the water or liquid present in the drinking-water system of the aircraft,
  to stop the injection of hot liquid without creating an air vacuum,
  to drain the liquid present in the device without sending it to the aircraft.

When it is supplied by the domestic water system, the device also comprises a module for accelerating water issuing from the domestic network in order to increase the discharge speed and therefore in the context of an application related to the cleaning of the drinking-water system of an aircraft, for filling the system of an aircraft.

In the context of an application related to the cleaning of the drinking-water system of an aircraft, it is the pressurisation means of the aircraft that drain the system once its reservoir or reservoirs have been filled with hot water.

According to another particularly advantageous feature of the invention, a high- or low-pressure pump drives the liquid discharged from the boiler. Naturally this pressure is higher than the boiler output pressure.

According to another particularly advantageous feature of the invention, a module for metering treatment product injects said product upstream of said high- or low-pressure pump.

According to another particularly advantageous feature of the invention, a module for metering treatment product injects said product downstream of said high- or low-pressure pump.

This metering module may be implemented by another pump.

According to another particularly advantageous feature of the invention, the condensation water resulting from the functioning of the boiler is used as an injected treatment product or as part of the injected treatment product. This is because the condensation water produced by the condensation boiler with a sealed combustion chamber is highly acidic since it contains nitric acid and sulphuric acid coming from the combustion gases. These acids may participate in certain cleaning operations. For example, the acidity will prevent the formation of a deposit of limescale on the surfaces or pipes being treated. They are therefore directly recycled and do not require a retreatment circuit.

The device further comprises a mobile chassis combining, in a very small volume, the various functional modules described above. This is because, in order to be able to fit in the baggage hold of an aircraft transporting passengers, the weight of the device is less than 200 kilograms and has a height less than or equal to 1.10 m. The functional and structural choices described above meet this requirement for compactness. The mobile chassis is equipped with damped wheels. In addition, the functional modules are fixed to the chassis with vibration-damping means, the dimensions are calculated to provide expansion clearances and the materials used are resistant to high temperature.

The fundamental concepts of the invention having just been disclosed above in their most elementary form, other details and features will emerge more clearly from a reading of the following description and with regard to the accompanying drawings, giving by non-limitative example several embodiments of a device according to the invention.

BRIEF DESCRIPTION OF THE DRAWINGS

FIG. 5 is a schematic drawing of a rear perspective view of the second embodiment of the device without its cladding walls;

FIG. 6 is a schematic drawing of a front perspective view of the device of FIG. 5;

FIG. 7 is a schematic drawing of an external front view of the intermediate reservoir;

DESCRIPTION OF PREFERRED EMBODIMENTS

Figure 1:
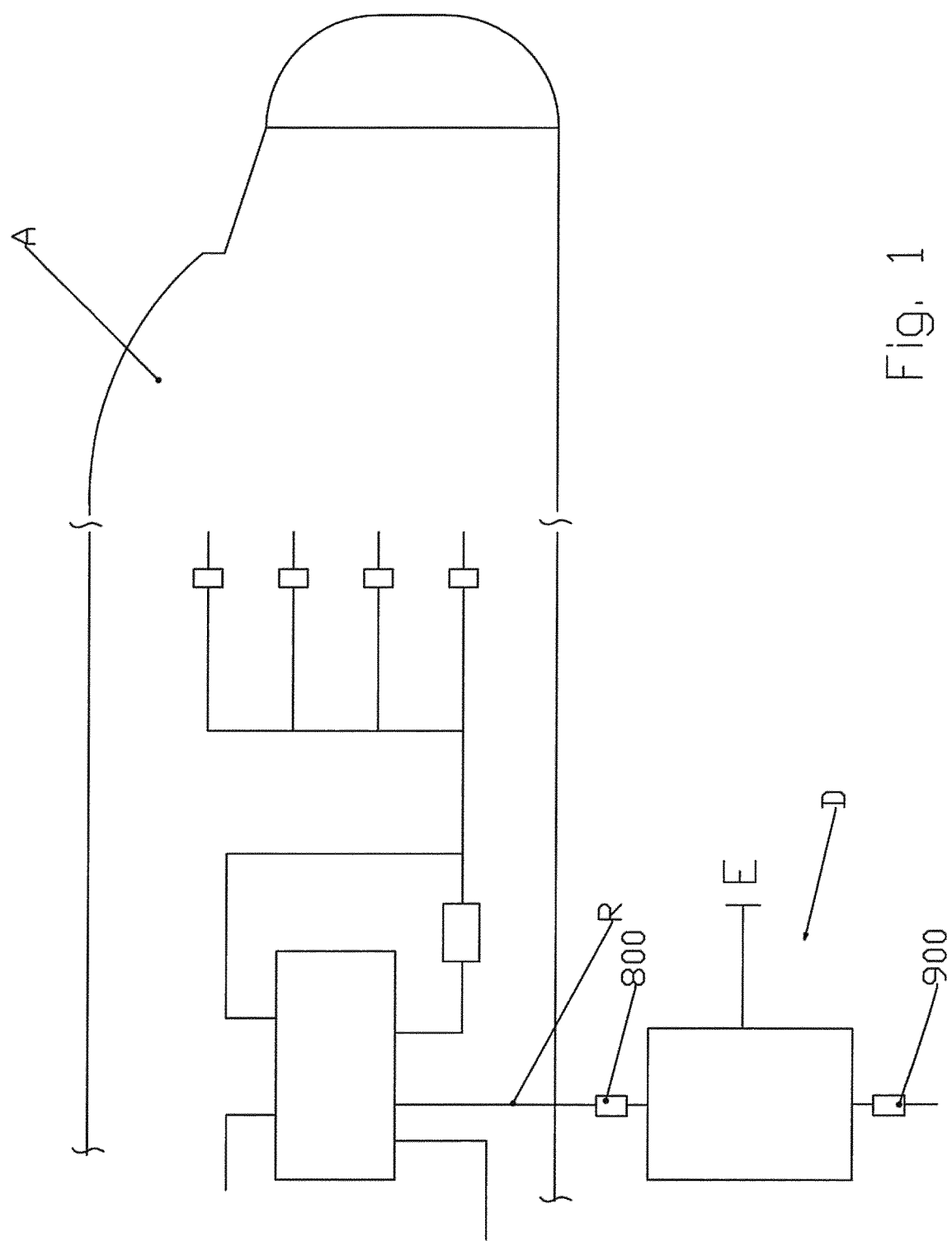
FIG. 1 is a schematic drawing of a device coming to be connected to the drinking-water network of an aircraft.

As illustrated by the drawing in FIG. 1, the device D of the invention is a device for producing hot water for the purpose of treating the system R of drinking-water pipes of an aircraft A. This device D, independent of said aircraft A, comprises a mobile chassis for being moved in a workshop and comes to be connected to the system R occasionally, that is to say only during the maintenance operation on the aircraft A that comprises the treatment of said system. This device D is supplied with water by the domestic system S available in the workshop. In addition, it is connected to the electrical system E.

Such a device must provide a production of hot water on the basis of a flow rate of 1000 litres per hour. Depending on the size of the aircraft A and the number of phases in the treatment method, the flow rate, the number of thousands of litres of water and the number of hours of the operation may vary.

The following description of the device is common to the various embodiments illustrated.

The device D comprises, on the same mobile chassis C (cf. FIG. 5), a plurality of functional subassemblies necessary for the rapid production of hot water in large volumes.

To do this, the device comprises a heating subassembly 100 comprising a condensing gas boiler with sealed combustion chamber 110. This boiler 110 is supplied via a conduit 120 by a gas-supply subassembly 200.

This gas-supply subassembly 200 accommodates two gas bottles 210 and 220 each associated with a valve 211 and 221 bringing the gas to a pressure-reducing valve 230.

One particularly advantageous feature of the invention lies in the presence of an intermediate gas reservoir 240 supplied by the gas passing through the pressure-reducing valve 230 and supplying the boiler 110 by means of a flow-rate regulator 250. By being positioned between the boiler 110 and the pressure-reducing valve 230 associated with the bottles 210 and 220, this reservoir 240 serves as a buffer reservoir guaranteeing a good mixing of the gas and a volume of gas constantly available for the boiler 110 whatever its output. As illustrated by the drawing in FIG. 7, the reservoir 240 is in a substantially cylindrical form having a bottom outlet orifice 241 and a top inlet orifice 242 for the gas. It also has an orifice 243 for decanting the condensation water droplets present in the reservoir 240. To assume this function, said reservoir 240 is positioned vertically as illustrated in the drawing in FIG. 5. Furthermore, according to another particularly advantageous feature, this reservoir 240 is up against a hot-water pipe increasing the temperature difference leading to condensation.

The boiler 110 heats water circulating in a so-called primary circuit 130 by means of a pump 131. The pressure is monitored by a gauge 132 and the temperature is monitored by a sensor 133. This primary circuit 130 further comprises a compensation vessel 134, a drain 135 and a safety valve 136. This primary circuit 130 will exchange its heat in order to provide the heating of the water to be injected into the circuit R of the aircraft A.

The water in this primary circuit 130 and also the water to be heated come from the same source S and pass through a water supply subassembly 300. This subassembly is connected to the system S and comprises an inlet valve 310 allowing or not passage of water from the system S through a filter 320. The volume of water emerging from the filter 320 is measured by a meter 330. A valve 340 controls the supply to the primary circuit 130. A valve 350 controls the supply of water to be heated.

This water to be heated exchanges with the primary water circuit 130 in the exchange subassembly 400.

The treatment water thus heated emerges in a discharge subassembly 500 that comprises an inlet valve 510 allowing or not the passage of the treatment water through a meter 520. The temperature of the water is monitored by a gauge 530. Between the meter 520 and the gauge 530, a module 540 for injecting treatment product alters the heated water for the purpose of optimisation of the treatment. The latter is controlled with the meter 520.

A last valve 550 controls the discharge of treatment water before it is injected into the circuit R.

A control subassembly 600 manages the output of the boiler and the injection of the treatment product according to the requirements and information issuing from the various sensors and gauges. Great flexibility in the management of said output is made possible because of the presence of the buffer reservoir 240 described above.

Figure 2:
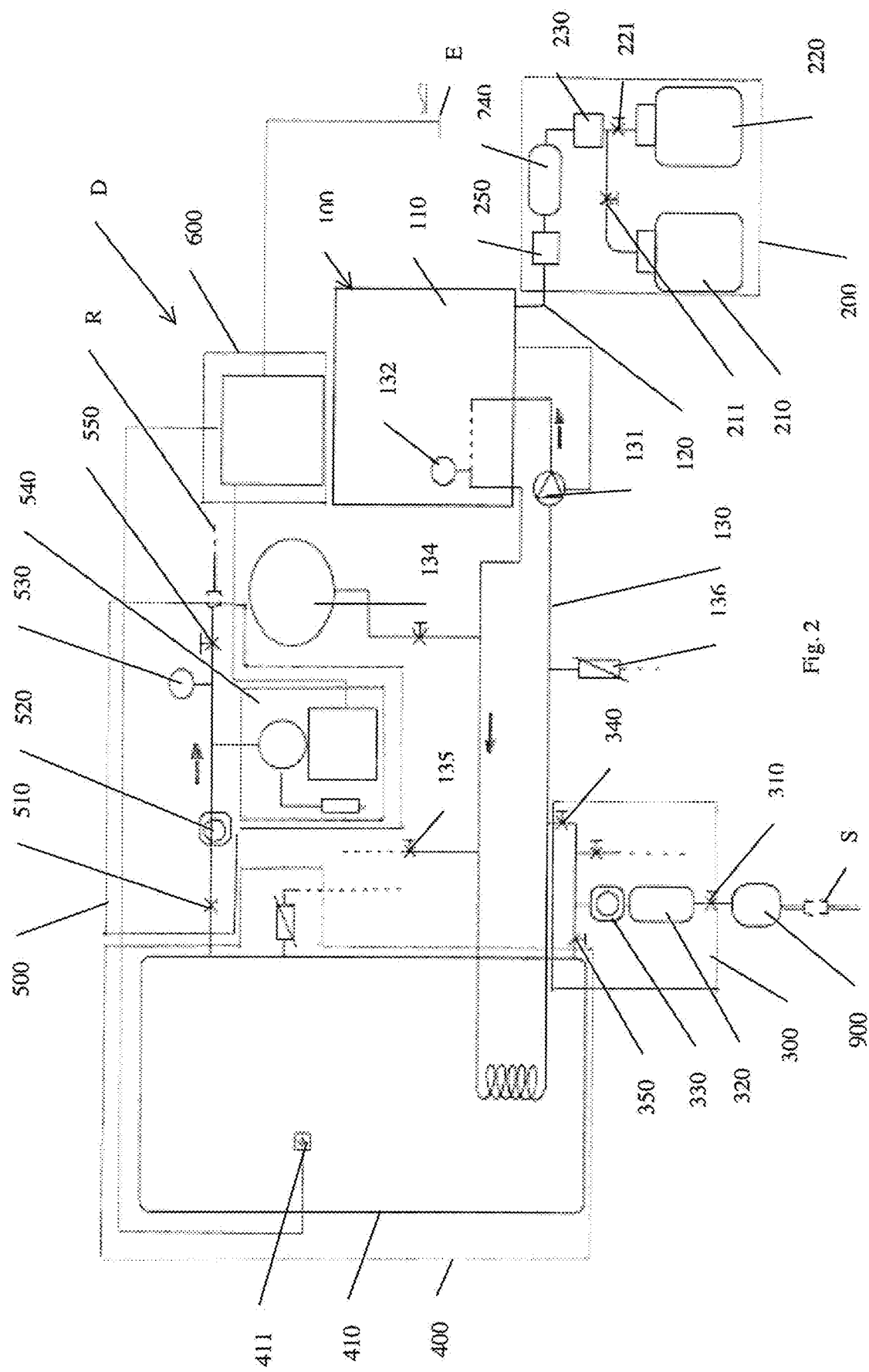
FIG. 2 is a functional diagram of a first embodiment.
Figure 3:
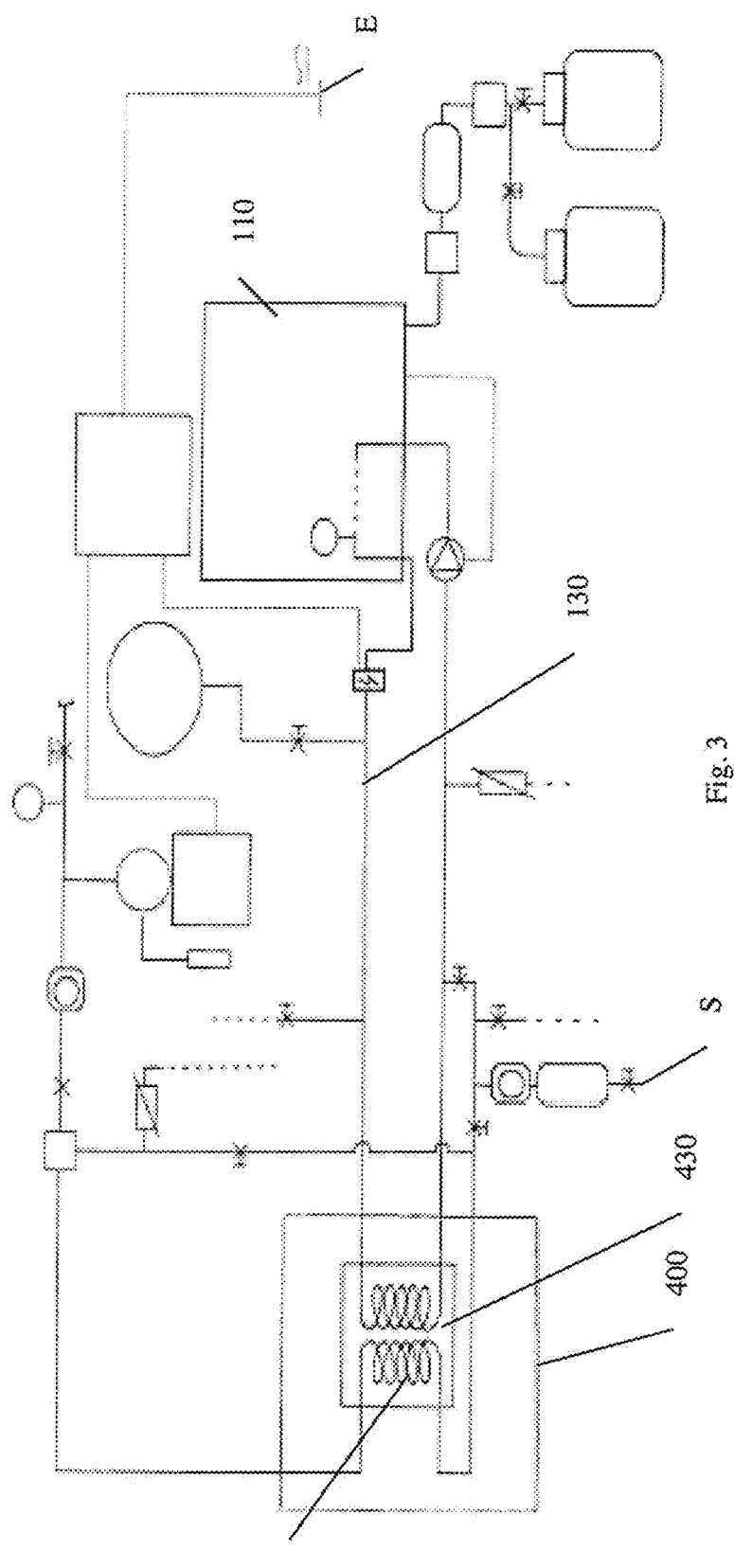
FIG. 3 is a functional diagram of a second embodiment.
Figure 4:
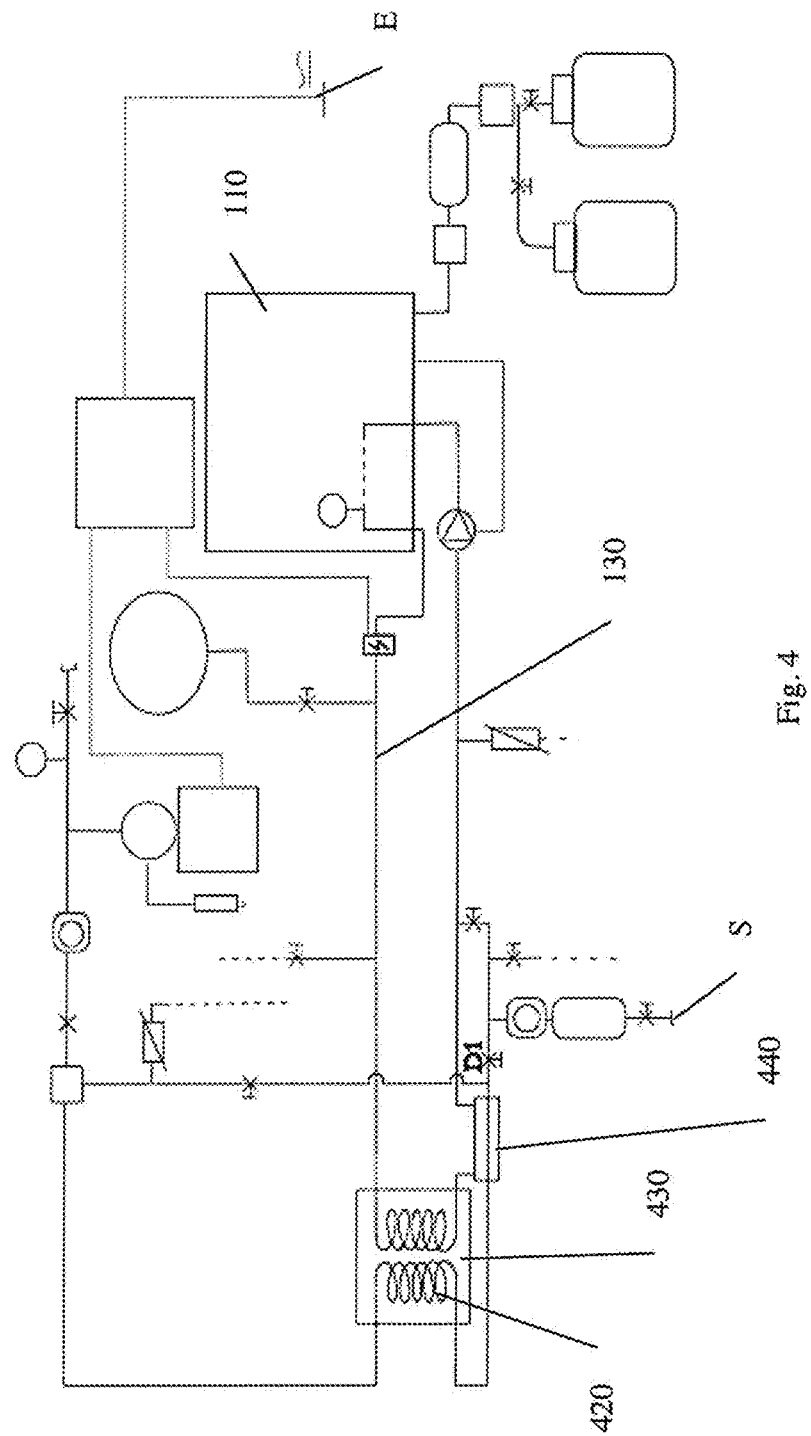
FIG. 4 is a functional diagram of a third embodiment.

The heat exchange technology between the primary circuit 130 and the treatment water may differ according to the embodiments illustrated by the drawings in FIGS. 2, 3 and 4.

According to the embodiment illustrated by the drawing in FIG. 2, the exchange subassembly 400 consists of a water vessel 410 in which the primary circuit circulates by means of a coil. A temperature sensor 411 monitors the temperature reached. A safety pressure valve 412 equips the vessel.

According to the embodiment illustrated by the drawing in FIG. 3, the boiler 100 heats a liquid in a primary circuit 130, which exchanges with a secondary circuit 420 in an exchanger 430.

According to the embodiment illustrated by the drawing in FIG. 4, the secondary water circuit 420 is preheated by means of the water in the primary circuit emerging from the exchanger 430 before returning to the boiler 110 at another exchanger 440.

The various functional subassemblies or the majority of their constituent elements are seen on the drawings of FIGS. 5 and 6, which nevertheless illustrate more particularly the second embodiment. The drawings in these figures illustrate the compactness of the device D. They illustrate in particular the compactness of the flue 111 equipping the boiler 110 and which is a dual-flow discharge flue. The chassis C consists of a set of profiled members 700 forming a parallelepiped comprising two horizontal frames 710 and 720 connected by uprights 730. The bottom frame 710 accommodates, on its bottom face, wheels 711 in contact with the ground. This set of profiled members 700 defines an internal space accommodating the various functional subassemblies of the device D. These vertical faces are protected by cladding walls, not illustrated. The frames 710 and 720 are each protected by a protective tube 712 and 721 preventing any direct impact on the chassis C.

Figure 8:
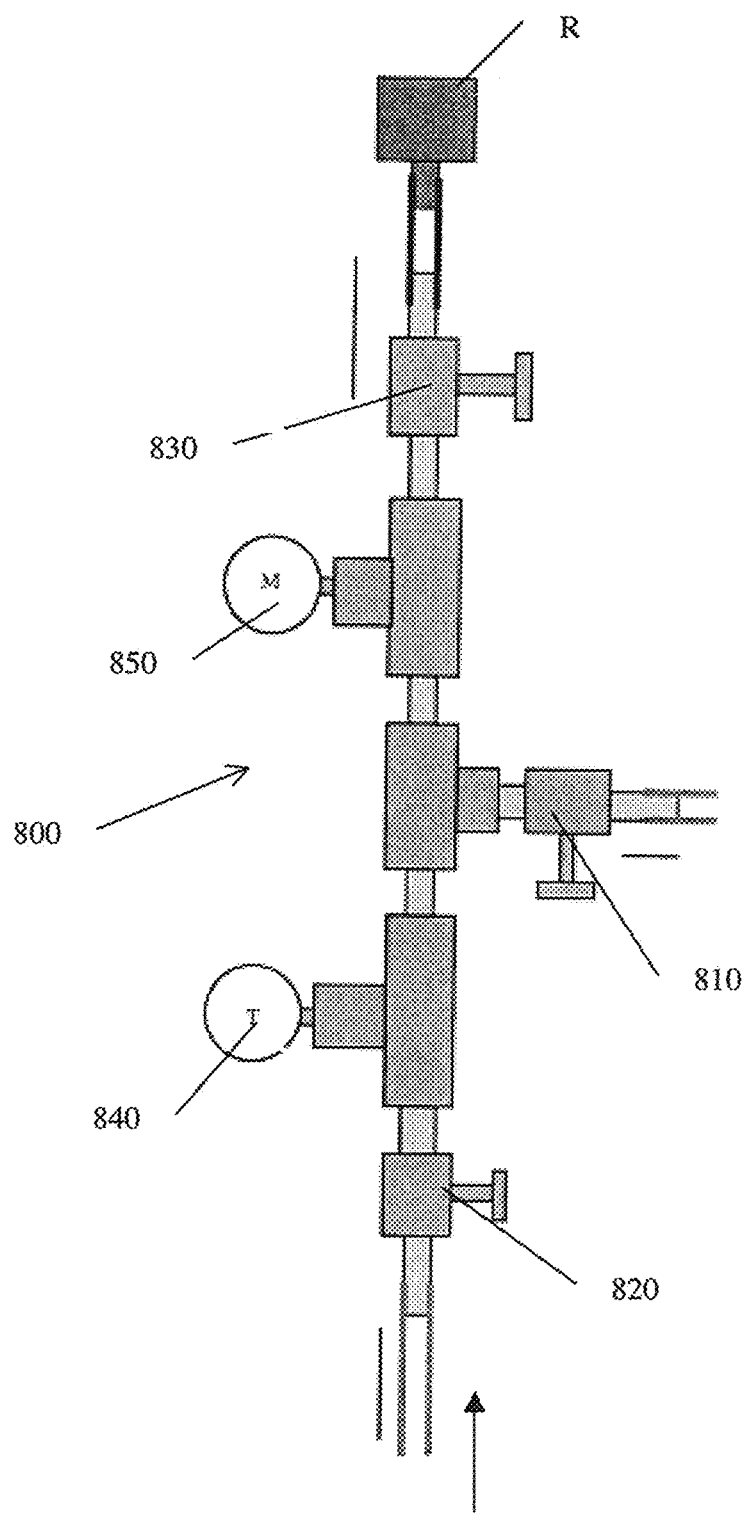
FIG. 8 is a functional diagram of the connection module.

As illustrated solely by the drawings in FIGS. 1 and 8, a connection module 800 is interposed between the device D and the drinking-water system R of the aircraft A. This device is among other things equipped with a valve 810, selecting the position of which makes it possible to:

drain the water already present in the system,
stop the injection of hot water without creating an air vacuum,
drain the water already present in the device.

This connection module also comprises inlet 820 and outlet 830 valves as well as a temperature gauge 840 and a pressure gauge 850.

As illustrated solely by the drawings in FIGS. 1 and 2, an auxiliary unit comprising a means for accelerating 900 (for example a pump equipped with a booster) the flow rate of the water issuing from the domestic system S provides upstream a supply to the device D enabling it to achieve accelerated filling of the drinking-water system R of the aircraft.

The water-pressurisation means equipping the aircraft, once the reservoir of the aircraft is filled, themselves provide passage of the hot water into the various pipes for cleaning purposes.

Figure 9:
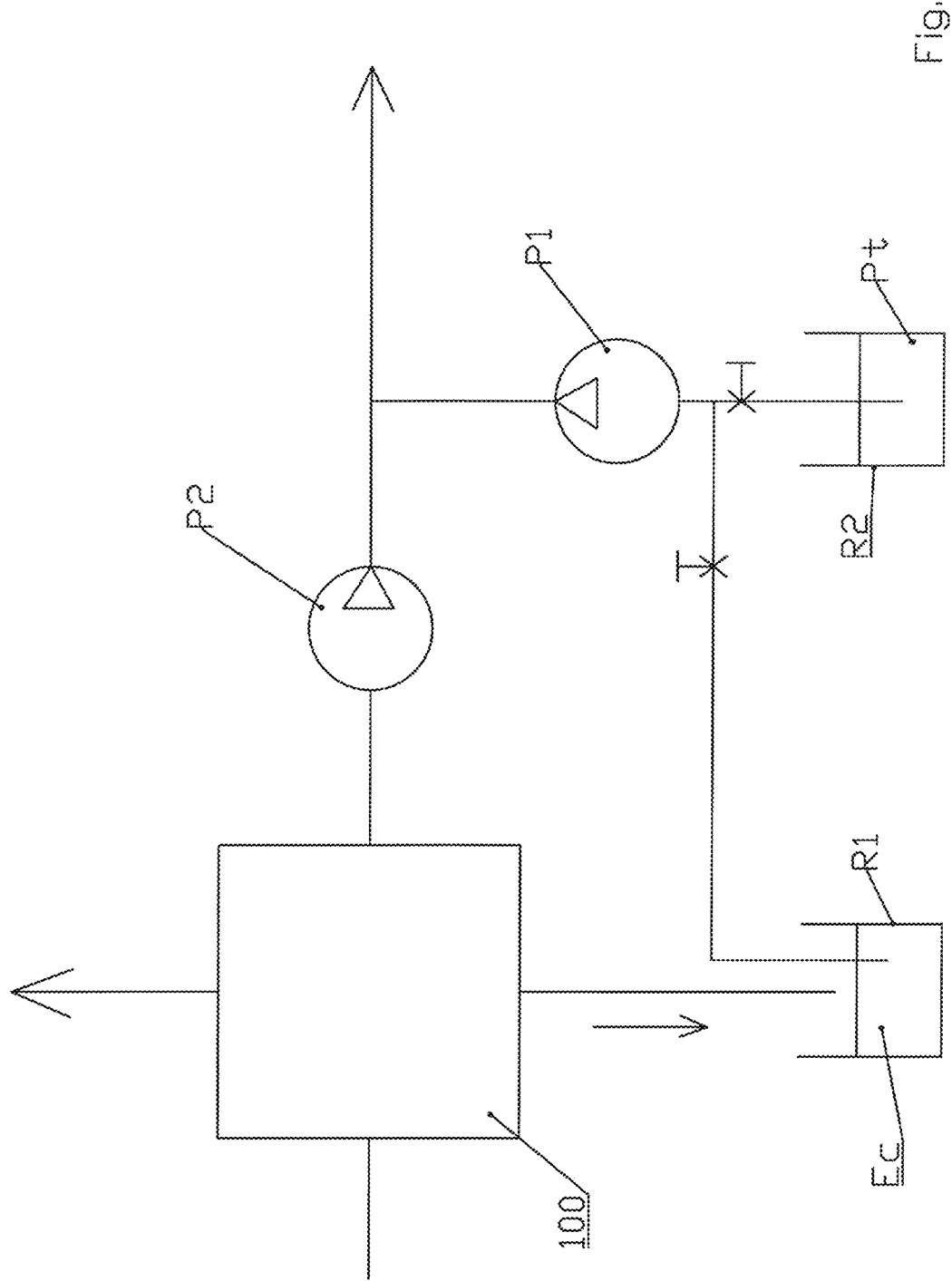
FIG. 9 is a functional diagram of a first embodiment of a device reusing the condensation water.
Figure 10:
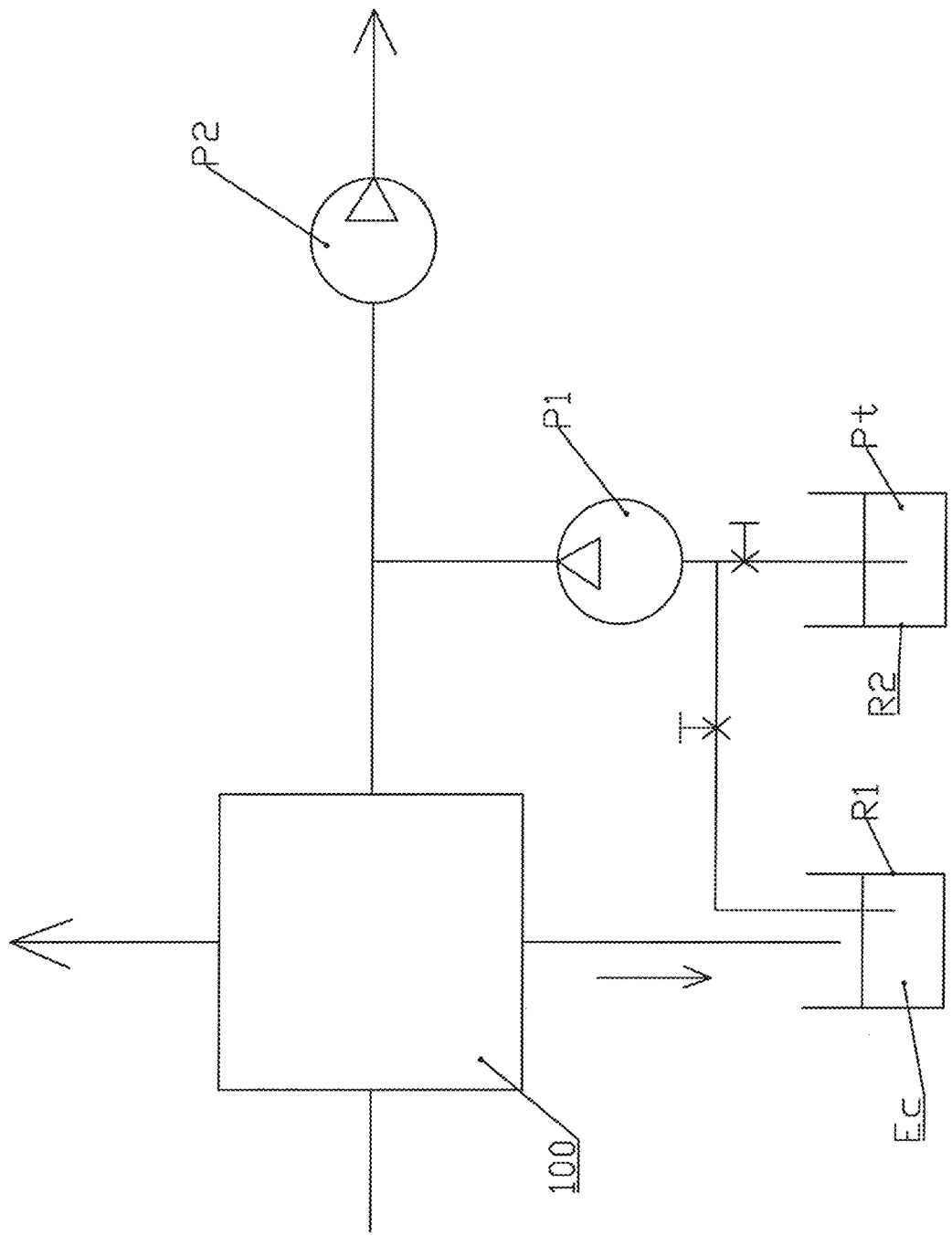
FIG. 10 is a functional diagram of a second embodiment of a device reusing the condensation water.

As illustrated on the drawings of FIGS. 9 and 10, the condensation water Ec produced by the boiler 100 is reused as a treatment product Pt to be injected into the cleaning liquid at the discharge from the boiler 100.

As illustrated, to do this, the condensation water Ec is recovered in a reservoir R1 and is decanted in a metered fashion or directly to a reservoir R2 in which a quantity of treatment liquid is situated. A pump P1 for injecting treatment product Pt assumes the function of a metering module and provides the injection of the treatment product Pt stored in the reservoir R2 into the pipe providing the discharge of the heated liquid coming from the boiler 100. A high- or low-pressure pump P2 drives the liquid discharged from the boiler 100. It may serve as an acceleration module.

The difference between the embodiment in FIG. 9 and the embodiment in FIG. 10 lies in the positioning of the injection of the treatment product Pt. The injection is carried out downstream of the pump P2 for the embodiment illustrated on the drawing of FIG. 9 and upstream for the embodiment illustrated on the drawing of FIG. 10.

It will be understood that the device that has just been described above and depicted was described and depicted with a view to disclosure rather than limitation. Naturally various arrangements, modifications and improvements can be made to the above example without departing from the scope of the invention.

The invention claimed is:

1. Cleaning device (D), for cleaning a drinking water system said device (D) being supplied with liquid, the device comprising:
   a mobile chassis (C);
   a condensing gas boiler comprising a sealed combustion chamber (110), said condensing gas boiler being supported by said mobile chassis;
   gas bottles (210, 220) for supplying gas to said condensing gas boiler in order to supply energy for the production of heat in said condensing gas boiler, said gas bottles being accommodated by said mobile chassis;
   a primary circuit (130) containing a liquid, said liquid of said primary circuit being heated by said condensing gas boiler;
   an exchange subassembly (400); and
   an output subassembly (500) capable of being connected to the drinking-water system during cleaning of the drinking-water system, in which said exchange subassembly and said output subassembly contain a treatment liquid for cleaning, and in which the treatment liquid is heated in order to clean by heat exchange with said liquid of said primary circuit in said exchange subassembly.

2. Device (D) according to claim 1, characterised in that the cleaning device cleans pipes of the drinking-water system (R) of an aircraft (A),
   said device (D) being independent of said aircraft (A) and being connectable to said drinking-water system (R) and being supplied with the treatment liquid.

3. Device (D) according to claim 1, characterised by the fact that the cleaning device comprises an intermediate gas reservoir (240);
   and pressure reducing valves (230) associated with the gas bottles, said intermediate gas reservoir (240) being positioned between the boiler (110) and the pressure reducing valves (230) associated with the gas bottles, in order to receive the gas from the gas bottles and to supply gas to the boiler (110).

4. Device (D) according to claim 1, characterised by the fact that the exchange subassembly (400) comprises a vessel (410) with a portion of the treatment liquid positioned inside, in which the boiler (110) provides the heating of said liquid in said primary circuit (130) and in which said liquid in said primary circuit (130) heats the treatment liquid in said vessel (410) by exchange of heat with said treatment liquid and said vessel (410).

5. Device (D) according to claim 1, characterised by the fact that the exchange subassembly (400) comprises a secondary circuit (420) and an exchanger (430), said treatment liquid being conducted in said secondary circuit (420), in which said condensing gas boiler (110) heats the liquid in said primary circuit (130), which exchanges heat with said secondary circuit (420) in said exchanger (430) in order to thus heat the treatment liquid.

6. Device (D) according to claim 5, characterised by the fact that said treatment liquid in the secondary circuit (420) is preheated by means of the liquid in the primary circuit (130) emerging from the exchanger (430).

7. Device (D) according to claim 1, characterised by the fact that said condensing gas boiler (110) is equipped with a dual-flow discharge flue (111).

8. Device (D) according to claim 2, characterised by the fact that the treatment liquid emerging from the exchange subassembly is a heated treatment liquid and that the device comprises a module (800) for connection to the drinking-water system of the aircraft (A) equipped with a valve (810), selecting the position of which makes it possible:
   to drain liquid present in the system (R) of the aircraft (A),
   to stop injection of hot liquid without creating an air vacuum,
   to drain liquid already present in the device (D).

9. Device (D) according to claim 1, characterised by the fact that the mobile chassis (C) is equipped with damped wheels (711).

10. Device (D) according to claim 2, characterised by the fact that the device is supplied by a domestic water system, and by the fact that the device comprises a module (900) for accelerating the water issuing from the domestic system in order to increase the filling speed of the system (R) of the aircraft (A).

11. Device (D) according to claim 1, characterised by the fact that a high- or low-pressure pump (P2) drives the treatment liquid discharged from the boiler.

12. Device (D) according to claim 11, characterised by the fact that a module for metering treatment product (Pt) injects said product upstream of said high- or low-pressure pump.

13. Device (D) according to claim 11, characterised by the fact that a module for metering treatment product (Pt) injects said product downstream of said high- or low-pressure pump.

14. Device (D) according to claim 1, characterised by the fact that condensation water (Ec) results from the functioning of the boiler (100), and the condensation water is used as an injected treatment product.

15. Device (D) according to claim 2, characterised by the fact that the device comprises an intermediate gas reservoir (240);
   and pressure reducing valves (230) associated with the gas bottles, said intermediate gas reservoir (240) being positioned between the boiler (110) and the pressure reducing valves (230) associated with the gas bottles, in order to receive gas from the gas bottles and to supply gas to the boiler (110).

16. Device (D) according to claim 2, characterised by the fact that the exchange subassembly (400) comprises a vessel (410) with a portion of the treatment liquid positioned inside, in which the boiler (110) provides the heating of said liquid in said primary circuit (130) and in which said liquid in said primary circuit (130) heats the treatment liquid in said vessel (410) by exchange of heat with said treatment liquid and said vessel (410).

17. Device (D) according to claim 2, characterised by the fact that the exchange subassembly (400) comprises a secondary circuit (420) and an exchanger (430), said treatment liquid being conducted in said secondary circuit (420), in which said condensing gas boiler (110) heats the liquid in said primary circuit (130), which exchanges heat with said secondary circuit (420) in said exchanger (430) in order to thus heat the treatment liquid.

18. Device (D) according to claim 2, characterised by the fact that said condensing gas boiler (110) is equipped with a dual-flow discharge flue (111).

19. Device (D) according to claim 2, characterised by the fact that the device comprises the mobile chassis (C) equipped with damped wheels (711).

20. Device (D) according to claim 1, characterised by the fact that the condensation water (Ec) results from the functioning of the boiler (100), and the condensation water is used as part of an injected treatment product.

* * * * *